(12) United States Patent
Paya et al.

(10) Patent No.: US 7,584,362 B2
(45) Date of Patent: Sep. 1, 2009

(54) SYSTEMS AND METHODS FOR PROVIDING SIGNATURES

(75) Inventors: Ismail Cem Paya, Seattle, WA (US); Peter L. Montgomery, Bellevue, WA (US); Adam Back, Saskatchewan (CA)

(73) Assignee: Microsoft Corporation, Redmond, WA (US)

( * ) Notice: Subject to any disclaimer, the term of this patent is extended or adjusted under 35 U.S.C. 154(b) by 910 days.

(21) Appl. No.: 11/112,410

(22) Filed: Apr. 22, 2005

(65) Prior Publication Data

US 2006/0242417 A1    Oct. 26, 2006

(51) Int. Cl.
*H04L 9/32* (2006.01)
*H04L 9/14* (2006.01)
*H04L 9/00* (2006.01)

(52) U.S. Cl. .................................. 713/176; 380/44
(58) Field of Classification Search ................ 713/176; 380/44
See application file for complete search history.

(56) References Cited

U.S. PATENT DOCUMENTS 5,016,274 A * 5/1991 Micali et al. ................ 705/66
6,212,637 B1 * 4/2001 Ohta et al. .................. 713/176
2005/0022102 A1 * 1/2005 Gentry ....................... 715/500

OTHER PUBLICATIONS

Shamir et al., Improved Online/Offline Signature Schemes, 2001, Springer-Verlag, Crypto 2001, pp. 355-367.*
Stern et al., Cryptanalysis of the OTM Signature Scheme from FC '02, 2003, Springer-Verlag, LNCS, pp. 138-148.*
Poupard et al., Security Analysis of a Practical "on the fly" Authentication and Signature Generation, 1998, Springer-Verlag, LNCS, pp. 422-436.*
Mannan et al., Secure Public Instant Messaging: A Survey, Oct. 2004, Proceedings of the 2nd Annual Conference on Privacy, Security and Trust, pp. 1-9.*

* cited by examiner

*Primary Examiner*—Kambiz Zand
*Assistant Examiner*—William S Powers
(74) *Attorney, Agent, or Firm*—Lee & Hayes, PLLC

(57) ABSTRACT

Systems and methods for providing signatures are described. In an implementation, a system includes a backend configured to generate a plurality of incomplete signatures using an offline portion of an online/offline signature algorithm, storage configured to store the plurality of incomplete signatures and a front end configured to process a plurality of messages using the plurality of incomplete signatures to form a plurality of digital signatures such that each of the messages has a corresponding one of the digital signatures.

20 Claims, 6 Drawing Sheets

SYSTEMS AND METHODS FOR PROVIDING SIGNATURES

TECHNICAL FIELD

The present invention generally relates to the field of message communication and more particularly relates to systems and methods for providing signatures for messages.

BACKGROUND

Communication of messages over a network has become a part of everyday life. For example, users may communicate, one to another, through the use of email, i.e., electronic mail. Email employs standards and conventions for addressing and routing such that the email may be delivered across a network, such as the Internet, utilizing a plurality of devices. In another example, users may communicate, one to another, through the use of instant messaging. When two users are online at the same time, for instance, instant messages may be exchanged in real time between the two users. In this way, the instant messages may be utilized to support a text conversation between the two users in a manner that mimics how the two users would participate in a typical spoken conversation.

Unfortunately, the popularity of network communication using messages has also resulted in a corresponding increase in the amount of "spam" encountered by the user. An example of "spam" is an unsolicited email that is sent to a large number of recipients, such as to promote a product or service. Because sending an email generally costs little or nothing to send, "spammers" have developed which send the equivalent of junk mail to as many users as can be located. Even though a minute fraction of the recipients may actually desire the described product or service, this minute fraction may be enough to offset the minimal costs encountered by the spammer in sending the spam. Consequently, a vast number of spammers are responsible for communicating a vast number of unwanted and irrelevant emails. The communication of spam results in significant costs to email providers as well as recipients of email that are forced to navigate through these unwanted and unsolicited messages.

One technique that may be utilized to combat spammers is through the use of "digital signatures". A digital signature (hereinafter also referred to as a "signature") may be used to authenticate an identity of the sender of a message. Therefore, the digital signature may be utilized to verify a source of a message and combat spammers who desire to hide their identity. However, computation of a digital signature may be costly in terms of processing resources. Therefore, a service (e.g., an email service) which desires to provide a digital signature for each of a multitude of messages sent by the service may be confronted with significant hardware, software and network costs to provide the signatures.

Therefore, there is a continuing need for improved techniques that may be utilized to provide signatures.

SUMMARY

Systems and methods for providing signatures are described. In an implementation, a method is described that includes generating a plurality of incomplete signatures utilizing an offline portion of an online/offline signature algorithm. The plurality of incomplete signatures is buffered in storage that is accessible by a module configured to process a plurality of messages. The module is configured to process each message using an online portion of the online/offline signature algorithm utilizing one of the incomplete signatures to generate a digital signature for the message.

In another implementation, a system includes a backend, a front end, and storage. The backend is configured to generate a plurality of incomplete signatures using an offline portion of an online/offline signature algorithm. The storage is configured to store the plurality of incomplete signatures. The front end is configured to process a plurality of messages using the plurality of incomplete signatures to form a plurality of digital signatures such that each of the messages has a corresponding one of the digital signatures.

BRIEF DESCRIPTION OF THE DRAWINGS

FIG. 1 is an illustration of an environment operable for communication of messages across a network, such as emails, instant messages, user authentication messages and so on.

The same reference numbers are utilized in instances in the discussion to reference like structures and components.

DETAILED DESCRIPTION

Overview

Figure 1:
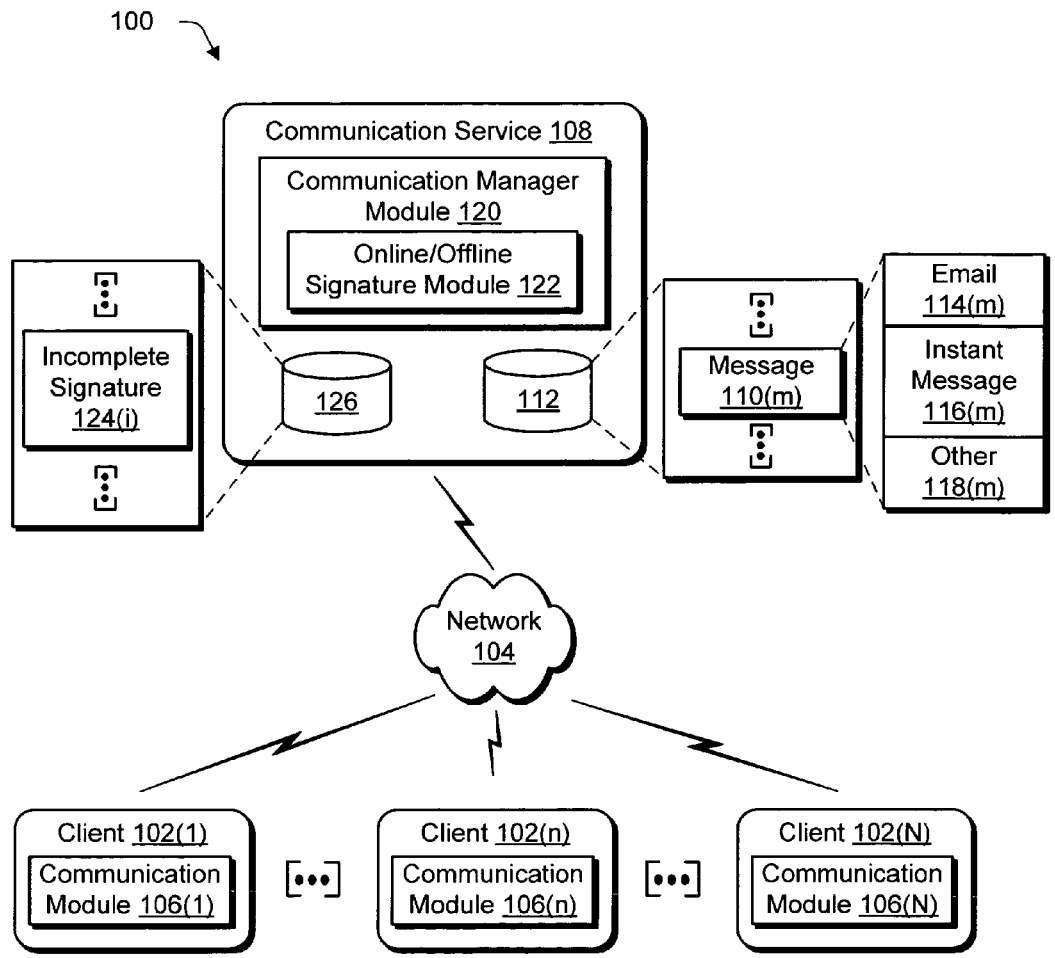

Systems and methods for providing signatures are described. Signatures may be utilized to provide a wide variety of functionality, such as to create accountability (e.g., the sender of a message "is who they say they are") and an avenue for legal recourse (e.g., to locate an actual sender of a message), which may be utilized to deter spamming, combat identity hiding, and so on. Computation of digital signatures may be costly in terms of processing resources. For example, a fast desktop personal computer (PC) by current standards may take anywhere from 2 to 5 milliseconds to compute a digital signatures using a Rivest, Shamir and Adleman (RSA) algorithm, depending on length of the message and key length. In the context of a client device (e.g., the personal computer) which performs a handful of signatures, this may be acceptable. However, in the context of a server which is expected to perform hundreds of transactions per second, each transaction involving multiple steps besides the computation of the digital signature itself, this may consume a significant fraction of the overall processing resources available from the server.

In an implementation, systems and methods are described for providing digital signatures in an improved and efficient manner. For example, an "offline/online" architecture is described for a system to generate the digital signatures such that a significant portion of the computation of the digital signature may be performed before receipt of a message which is to utilize the digital signature. In other words, the majority of the computation (e.g., as measured in processing time or CPU cycles) may be performed independently of the message to be signed, in contrast to traditional signature algorithms that depend on taking a message and performing some operations directly on the message itself.

A system, for instance, may include a backend, a front end and storage. The backend is configured to perform a computation on a random input which is selected independently of a message to obtain an incomplete signature. This is the "offline" portion of the offline/online signature algorithm. The incomplete signatures computed by the backend are stored in the storage and may act as a "buffer" between the backend and the front end. Then, in the "online" portion of the online/offline signature algorithm, the front end selects and retrieves one of the incomplete signatures and utilizes it to process a message to obtain the final digital signature for that message. Thus, in this architecture the backend may produce incomplete signatures independently of the front end and the messages. A variety of other architectures are also contemplated, further discussion of which may be found in relation to FIGS. 2, 3, 5 and 6.

In the following discussion, an exemplary environment is first described which is operable to employ the digital signature techniques. Exemplary procedures are then described which may be performed in the exemplary environment, as well as in other environments.

Exemplary Environment

FIG. 1 is an illustration of an environment 100 operable for communication of messages across a network. The environment 100 is illustrated as including a plurality of clients 102(1), . . . , 102(n), . . . , 102(N) that are communicatively coupled, one to another, over a network 104. The plurality of clients 102(1)-102(N) may be configured in a variety of ways. For example, one or more of the clients 102(1)-102(N) may be configured as a computer that is capable of communicating over the network 104, such as a desktop computer, a mobile station, a game console, an entertainment appliance, a set-top box communicatively coupled to a display device, a wireless phone, and so forth. The clients 102(1)-102(N) may range from full resource devices with substantial memory and processor resources (e.g., personal computers, television recorders equipped with hard disk) to low-resource devices with limited memory and/or processing resources (e.g., traditional set-top boxes). In the following discussion, the clients 102(1)-102(N) may also relate to a person and/or entity that operate the client. In other words, client 102(1)-102(N) may describe a logical client that includes a user, software and/or a machine.

Additionally, although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks. For instance, clients 102(1), 102(n) may be communicatively coupled via a peer-to-peer network to communicate, one to another. Each of the clients 102(1), 102(n) may also be communicatively coupled to client 102(N) over the Internet. In another instance, the clients 102(1), 102(n) are communicatively coupled via an intranet to communicate, one to another. Each of the clients 102(1), 102(n) in this other instance is also communicatively coupled via a gateway to access client 102(N) over the Internet.

Each of the plurality of clients 102(1)-102(N) is illustrated as including a respective one of a plurality of communication modules 106(1), . . . , 106(n), . . . , 106(N). In the illustrated implementation, each of the plurality of communication modules 106(1)-106(N) is executable on a respective one of the plurality of clients 102(1)-102(N) to send and receive messages. For example, one or more of the communication modules 106(1)-106(N) may be configured to send and receive email. As previously described, email employs standards and conventions for addressing and routing such that the email may be delivered across the network 104 utilizing a plurality of devices, such as routers, other computing devices (e.g., email servers), and so on. In this way, emails may be transferred within a company over an intranet, across the world using the Internet, and so on. An email, for instance, may include a header, text, and attachments, such as documents, computer-executable files, and so on. The header contains technical information about the source and oftentimes may describe the route the message took from sender to recipient.

In another example, one or more of the communication modules 106(1)-106(N) may be configured to send and receive instant messages. Instant messaging provides a mechanism such that each of the clients 102(1)-102(N), when participating in an instant messaging session, may send text messages to each other. The instant messages are typically communicated in real time, although delayed delivery may also be utilized, such as by logging the text messages when one of the clients 102(1)-102(N) is unavailable, e.g., offline. Thus, instant messaging may be though of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received. Thus, communication modules 106(1)-106(N) may be configured for "real-time delivery" of messages (e.g., instant messaging), "store and forward delivery" of messages (e.g., email), and so on.

In an implementation, the communication modules 106(1)-106(N) communicate with each other through use of a communication service 108. The communication service 108 may be configured to provide a wide variety of functionality, such as to communicate messages between the clients 102(1)-102(N), provide virus protection, generate digital signatures for authenticating a source of the message, and so on. The communication service 108 is illustrated as including a plurality of messages 110(m), where "m" can be any integer from one to "M", each of which is stored in a database 112. As previously described, the messages 110(m) may assume a wide variety of configurations, such as email 114(m), instant messages 116(m), and other 118(m) types of messages. For example, the messages 110(m) are not limited to messages for communication between the plurality of clients 102(1)-102(N), but may include a wide variety of other textual and non-textual messages (e.g., graphical messages, audio messages, and so on) without departing from the sprit and scope thereof. For instance, the message 110(m) may be configured as a message to authenticate a user from an authentication service, an example of which is the MICROSOFT PASSPORT service (MICROSOFT and PASSPORT are both trademarks of the Microsoft Corporation, Redmond, Wash.). For example, an authentication service may be utilized to authenticate a client for access to the communication service 108.

To manage the plurality of messages 110(m), the communication service 108 includes a communication manager module 120 (hereinafter "manager module"). In one example, the manager module 120 is executable thereon to route instant messages between the communication modules 106(1)-106(N). For instance, client 102(1) may cause the communication module 106(1) to form an instant message for communication to client 102(n). The communication module 106(1) is executed to communicate the instant message to the communication service 108, which then executes the manager module 120 to route the instant message to the client 102(n) over the network 104. The client 102(n) receives the instant message and executes the respective communication module 106(n) to display the instant message to a respective user.

In another example, the communication service 108 may be configured to store and route email, such as through configuration as an email provider. For instance, like the previous example, client 102(1) may execute the communication module 106(1) to form an email for communication to client 102(n). The communication module 106(1) communicates the email to the communication service 108, which is then stored as one of the plurality of messages 110(m). Client 102(n), to retrieve the email, "logs on" to the communication service 108 (e.g., by providing a user identification and password) and retrieves emails from a respective user's account. In this way, a user may retrieve corresponding emails from one or more of the plurality of clients 102(1)-102(N) that are communicatively coupled to the communication service 108 over the network 104.

The manager module is illustrated as including an online/offline signature module 122 that is executable to generate a digital signature using an online/offline signature algorithm. An online/offline signature algorithm is generally performed using two portions, an "offline" portion which may be performed without having a message to process and an "online" portion which is utilized to process the message. For example, the offline portion of the online/offline signature algorithm may process a plurality of random numbers using an encryption key to derive a plurality of incomplete signatures 124(i) (where "i" can be any integer from one to "I") which are illustrated as stored in storage 126. The "online" portion of the online/offline signature algorithm then processes the message 110(m) using the incomplete signature 124(i) to derive the "full" digital signature. In this way, a portion of the computation of the digital signature (i.e., the "offline" portion) may be performed before the message 110(m) is even received by the communication service 108. Thus, by utilizing the online/offline signature module 122, the environment 100 may be configured to efficiently generate digital signatures without being constrained by having to wait until a message is received before processing is begun. This, in turn, may be utilized to construct an architecture which takes advantage of this flexibility that has low latency when responding to requests, is scalable for large volumes, may "smooth-out" fluctuations in demand, and so on, further discussion of which may be found in relation to the following figure.

Generally, any of the functions described herein can be implemented using software, firmware (e.g., fixed-logic circuitry), manual processing, or a combination of these implementations. The terms "module" and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the digital signature techniques described below are platform-independent, meaning that the techniques may be implemented on a variety of commercial computing platforms having a variety of processors.

Figure 2:
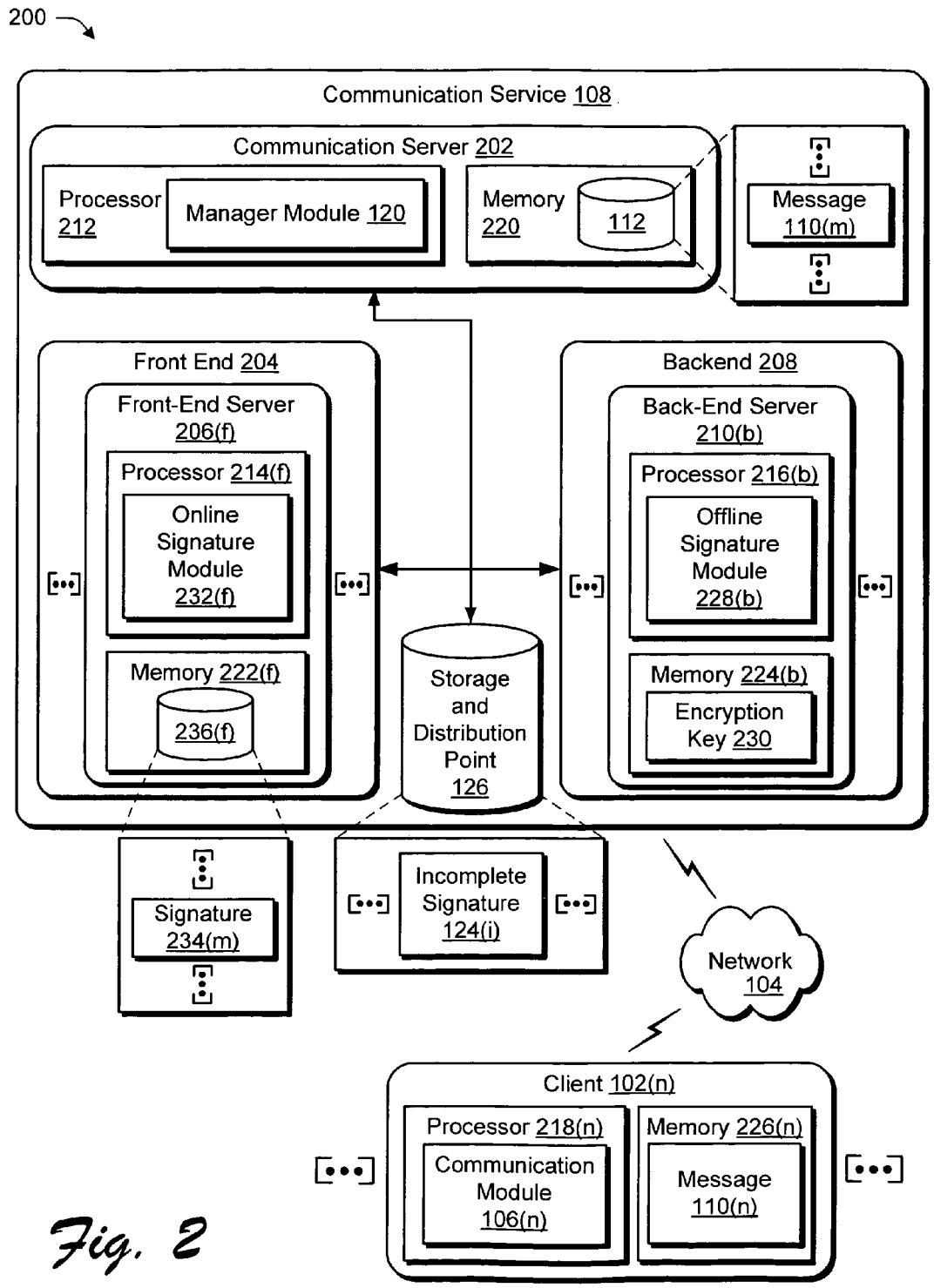
FIG. 2 is an illustration of a system showing a client and a communication service of FIG. 1 in greater detail, the communication service is depicted as implementing a front end/backend architecture.

FIG. 2 is an illustration of a system 200 showing the communication service 108 as implementing a front end/backend architecture and the client 102(n) of FIG. 1 in greater detail. The communication service 108 and the client 102(n) are illustrated as being implemented by a plurality of computing devices. For example, the communication service 108 is illustrated as having a communication server 202, a front end 204 having a plurality of front-end servers 206(f) (where "f" can be any integer from one to "F"), a backend 208 having a plurality of backend servers 210(b) (where "b" can be any integer from one to "B"), and a client 102(n) implemented as a client device. The communication server 202, front-end servers 206(f), back-end server 210(b), and client 102(n) each include a respective processor 212, 214(f), 216(b), 218(n) and a respective memory 220, 222(f), 224(b), 226(n).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 220, 222(f), 224(b), 226(n) is shown, respectively, for the communication server 202, front-end servers 206(f), back-end server 210(b), and client 102(n), a wide variety of types and combinations of memory may be employed, such as random access memory (RAM), hard disk memory, removable medium memory, and so forth.

The manager module 120 is illustrated as being executed on the processor 212 and is storable in memory 220. The manager module 120 is executable to manage the plurality of messages 110(m) which are illustrated as stored in a database 112 of the memory 220 of the communication server 202. The manager module 120, for instance, may allow the client 102(n) to "logon" to the communication service 108 to retrieve messages 110(m) which correspond to the client 102(n). A variety of other management techniques may also be utilized, such as digital rights management, and so on.

Additionally, the manager module 120 may interact with the front end 204 and backend 208 to obtain one or more digital signatures for one or more of the messages 110(m). In one implementation, for instance, multiple incomplete signatures may be utilized to compute a single "complete" signature. In such an instance, different subsets of the incomplete signatures may be combined to create a single signature. In this case the buffer of incomplete signatures might remain unchanged or be partially updated whereas other schemes might delete an incomplete signature from that buffer. Operation of the front end 204 and the backend 208 to provide the functionality of the online/offline signature module 122 of FIG. 1 will be discussed in turn in the following paragraphs.

The backend 208 is illustrated as executing an offline signature module 228(b) on a processor 216(b) of a back-end server 210(b), which is also storable in memory 224(b). The offline signature module 228(b) is representative of functionality of the online/offline signature module 122 of FIG. 1 which is utilized to perform an "offline portion" of an online/offline signature algorithm. As previously described, the "offline portion" may be performed without utilizing the message 110(m) to derive a plurality of incomplete signatures 124(i). For example, the offline signature module 228(b) may accept a random number and apply an encryption key 230 to the random number using the offline portion of the signature algorithm to obtain an incomplete signature 124(i). Therefore, each random number may be utilized to derive a unique incomplete signature 124(i) without utilizing the message 110(m). The offline signature module 228(b) may then store these incomplete signatures 124(i) in a storage and distribution point 126 (i.e., the storage 126 of FIG. 1) for access by the front end 204. This storage may be performed in a variety of ways, such as by employing "push" or "pull" communication techniques. In this way, the backend 208 may generate and store the incomplete signatures 124(i) in the storage 126 irregardless of the status of the front end 204, thereby buffering the operation of the front end 204 from the backend 208.

The front end 204 is illustrated as executing an online signature module 232(f) which is executable on the processor 214(f) of the front-end server 206(f) to perform the "online" portion of the online/offline signature algorithm. For example, the online signature module 232(f) is executable to process message 110(m) utilizing an incomplete signature 124(i) obtained from the storage and distribution point 126. This "obtaining" may also be performed utilizing a variety of communication techniques, such as "push" or "pull" techniques. The processing performed by the online signature module 232(f) is performed utilizing the "online" portion of the online/offline signature algorithm to compute a digital signature 234(m) for the message 110(m), which is illustrated as stored in a database 236(f) in the memory 222(f) of the front-end server 206(f). Thus, even though the incomplete signature 124(i) was pre-computed without the message 110(m), the final digital signature 234(m) still corresponds to the message 110(m).

In an implementation, use of the online/offline signature algorithm may be utilized to reduce latency in the communication of messages having digital signatures over the network 104 by the communication service 108. For example, the offline portion of the online/offline signature algorithm may consume over ninety-five percent of the processing resources utilized to compute a digital signature. Therefore, by having the incomplete signature 124(i) available for use by the front end 204, the online portion of the online/offline signature algorithm may quickly "finish" the computation of the digital signature for a particular message 110(m) without waiting for that ninety-five percent of the computation to be performed. Use of this architecture may also be utilized to "smooth out" fluctuations in demand for digital signatures and to efficiently scale a system employing the architecture, further discussion of which may be found in relation to FIG. 3.

Although the front end 204, the storage and distribution point 126, and the backend 208 are illustrated separately in FIG. 2, these components of the digital signature architecture may be combined, further separated, and rearranged in a variety of ways. Further, the system 200 may be employed in a variety of environments. For instance, the front end 204, backend, and storage and distribution point 126 may be utilized by an authentication service, such as the MICROSOFT PASSPORT authentication system (MICROSOFT and PASSPORT are both trademarks of the Microsoft Corporation, Redmond, Wash.). In such an instance, the messages 110(m) are user authentication messages (e.g., authentication tickets, authentication tokens) which are signed by the authentication system to verify the identity of a user. Thus, in this instance the messages 110(m) may be communicated from the authentication service to an email provider to verify the identity of a client. A variety of other messages may also be digitally signed by the described architectures without departing from the spirit and scope thereof. For example, the client 102(n) may include a message 110(n) obtained from the communication service 108 and verify the identity of a sender of the message 110(n) through communication with the communication service 108.

Figure 3:
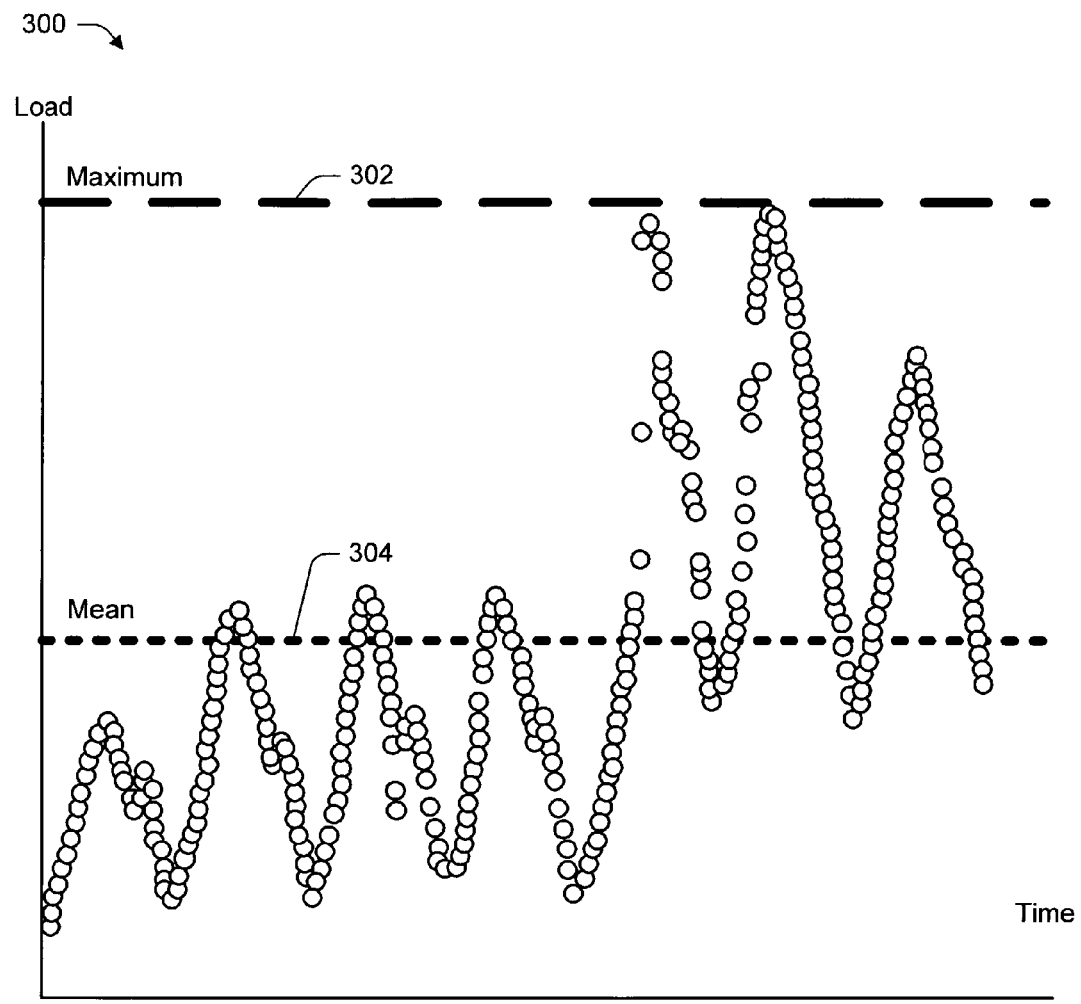
FIG. 3 is an illustration of a chart showing an exemplary load over a period of time for an authentication service as utilized by an email provider.

FIG. 3 is an illustration of a chart 300 showing an exemplary load over a period of time for an authentication service as utilized by an email provider. The calculation of the incomplete signature 124(i) may also be utilized to derive an efficient architecture for computing signatures that is resistant to "spikes" in demand for digital signatures. Since the pre-computation for any number of incomplete signatures 124(i) may be done in advance of the need to sign any particular message, the storage and distribution point 126 may act as a "buffer" between the computation of the incomplete signatures 124(i) and the final signature 234(m) for the message 110(m). For instance, during normal use in a steady state, the number of incomplete signatures 124(i) in storage 126 may be relatively constant. In other words, the backend 208 is able to "keep up" with the consumption of the incomplete signatures 124(i) by the front end 204. During a spike in consumption, however, the front end 204 may consume incomplete signatures 124(i) at a rate that is greater than the signatures 124(i) are computed by the backend 208. However, this does not represent a problem because the additional supply of incomplete signatures 124(i) available in storage 126 may be consumed by the front end 204 in such an instance. The backend 208 may then "refill" the storage 126 during periods of time that the front end 204 is consuming the incomplete signatures 124(i) at a rate which is less than the rate, at which, the backend 208 may generate the incomplete signatures 124(i). This property, along with a sufficiently large buffer, allows the back end to effectively function with just enough capacity for average demand, instead of peak demand as was previously required.

For example, the chart 300 of FIG. 3 includes a vertical axis for "load" of a digital signature system and a horizontal axis which represents "time". Previous digital signature systems were required to provide enough processing resources for the maximum 302 amount of usage projected. Otherwise, such previous digital signature systems would encounter increased latencies when sending messages to wait for the digital signature system to process a digital signature for each message. However, by separating the processing of the incomplete signatures from the requirement of having to operate on the particular message, the present architecture may be configured to address the "mean" load 304 during that period of time.

During low-load periods when the front end is consuming fewer than average signatures per second, for instance, the number of incomplete signatures in the "buffer" (i.e., the storage and distribution point 126) grows. During high-load load periods, the front end consumes more incomplete signatures than are produced by the backend. This extra demand for incomplete signatures is satisfied by the "extra" incomplete signatures available from the storage 126. The net effect is that the architecture can temporarily handle much higher demand for signatures than its average demand based on the number of incomplete signatures that are available in storage 126, and thus may handle "cyclic loads".

Thus, the front end/backend architecture may also support latency reduction and "load-smoothing". For example, the front end 204 and the backend 208 may be implemented on a single computing device. In this case, the computing device may use its idle time to generate incomplete signatures. Therefore, when a message is available which is to be signed, the computing device may perform the online portion of the computation of the digital signature quicker than would otherwise be possible, thereby lowering message processing latency of the system.

The front end/backend architecture may also support efficient scaling of resources utilized to perform the respective processing. For example, the front end 204 and the backend 208 may be implemented on separate computing devices as shown in FIG. 2. In this case, the front end 204 and the backend 208 may be scaled separately. For example, if a system employing this architecture needs to service a larger number of signatures per unit of time, capacity may be added to the backend 208 to service this larger number of signatures. This capacity may be added in a variety of ways. For example, the back-end servers 210(b) may be provided with cryptographic accelerators to increase the processing speed of the backend 208, additional back-end servers 210(b) may be added to the backend 208, and so on. Further discussion of front end/backend system configuration may be found in relation to FIG. 6.

Exemplary Procedures

The following discussion describes digital signature techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 4:
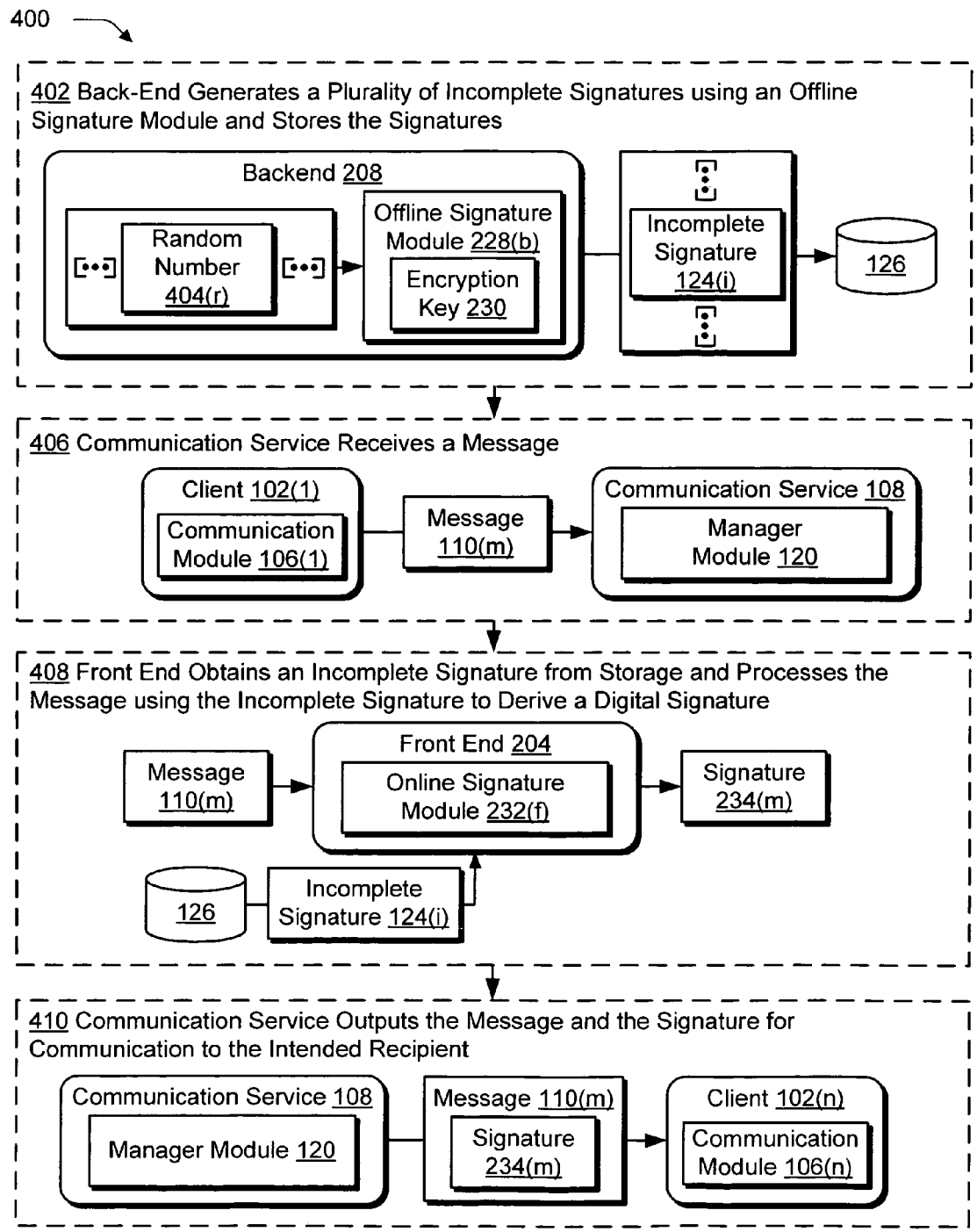
FIG. 4 is a flow diagram depicting a procedure in an exemplary implementation in which a front end/backend architecture of FIG. 2 is utilized to produce digital signatures using an online/offline signature algorithm.

FIG. 4 is a flow diagram depicting a procedure 400 in an exemplary implementation in which a front end/backend architecture is utilized to produce digital signatures using an online/offline signature algorithm. A backend 208 generates a plurality of incomplete signatures 124(i) by executing an offline signature module 228(b) and stores the incomplete signatures 124(i) in storage 126 (block 402). For example, the offline signature module 228(b) may accept as an input a plurality of random numbers 404(r) (where "r" can be any integer from one to "R") and an encryption key 230, which in this case is a "private" key of a public/private key pair. The offline signature module 228(b) is executable to perform an offline portion of an online/offline signature algorithm using the random numbers 404(r) and encryption key 230 such that each random number 404(r) is utilized to generate a corresponding incomplete signature 124(i).

A communication service receives a message 110(m) (block 406) to be digitally signed. For example, the message may be configured as an email, an instant message, a user-authentication message, and so on. To configure the message 110(m) for verification by others, the communication service digitally signs the message 110(m). The communication service 108, for instance, may pass the message 110(m) to a front end 204.

The front end 204 obtains an incomplete signature 124(i) from storage 126 and processes the message 110(m) utilizing the incomplete signature 124(i) to derive a signature 234(m) for the message 110(m) (block 408). For example, the front end 204 may execute an online signature module 232(f) which employs an online portion of an online/offline signature algorithm. The online portion may be configured in a variety of ways for efficient processing of the message. For example, an online/offline signature algorithm may include an online portion that employs a hashing function. Therefore, the communication service, through execution of the online signature module 232(f), may efficiently process the message 110(m) with minimal delay and then output the message 110(m) and the corresponding signature 234(m) for communication to its intended recipient (block 410), which is illustrated as client 102(n).

The intended recipient (e.g., client 102(n)) may then authenticate the source of the message 110(m) (e.g., communication service 108) through use of the digital signature 234(m). For example, the client 102(n) may execute the communication module 106(n) to process the message 110(m) using the digital signature 234(m) and a public key of a public/private encryption key pair to verify the message. A variety of other techniques may also be utilized.

A variety of online/offline signature algorithms may be utilized. For example, one such signature scheme is the Digital Signature Algorithm (DSA), as described in Bruce Schneier, Applied Cryptography, Second Edition, John Wiley & Sons, 1996, Chapter 20. It has some systemwide parameters, shared by all signers and verifiers:

p—a large prime, typically 512 to 1024 bits;

q—a prime factor of p−1, typically 160 bits;

g—an element of order q in the multiplicative group GF(p)* modulo p; and

H—a hash function taking a message as input, with output from 0 to q−1.

Each signer has its own private exponent x from 1 to q−1, which it keeps secret. But the signer reveals its public key $y=g^x$, an element of GF(p)*.

For each message m to be signed, the signer selects a random exponent k from 1 to q−1 (different k for each message). Let $k^{-1}$ denote the multiplicative inverse of k modulo q. The signer computes the following:

$$r=(g^k \bmod p) \bmod q \text{ and } s=k^{-1}(H(m)+xr) \bmod q.$$

If s=0, the algorithm restarts with a fresh k. Otherwise the signed message is the triplet (m, r, s).

The values of r and $k^{-1}$ do not depend on the message m. Thus, this portion can be computed offline, on a separate processor, before the message m is known. When m arrives, a single hash computation H(m) plus two multiplications and one addition modulo q is performed. The expensive exponentiation $g^k$ mod p is performed completely offline.

Another signature algorithm is ECSP-DSA, otherwise known as the Elliptic Curve Signature Primitive, DSA version, presented in Section 7.2.7 of IEEE Std. 1363-2000, IEEE Standard Specifications for Public-Key Cryptography, August, 2000. The system-wide parameters include:

q—a prime or prime power;

E—an elliptic curve over the field GF(q);

r—a prime dividing the group order |E|;

G—a point in E of order r;

x—function returning the x-coordinate of a finite point on E (element of GF(q)); and FE2IP —Function converting an element of GF(q) to an integer.

As in DSA, each signer has a private exponent, here called "s", which ranges from 1 to r−1. The public key, W=sG, is not needed by the signing algorithm.

To sign a message m with representative f (which might be H(m) for some hash function H), the following steps may be performed:

1) Select a random integer k from 1 to r−1. Let $k^{-1}$ denote its inverse modulo r.
2) Let c=FE2IP(x(kG)) mod r. Observe kG is finite due to the restrictions on k. If c=0, return to step 1.
3) Compute d=$k^{-1}$(f+sc)mod r. If d=0, return to step 1.

Then the signed message is the triplet (m, c, d). Here steps (1) and (2) do not reference m or f, and can be done before m is known. A variety of other online/offline signature algorithms are also contemplated.

Figure 5:
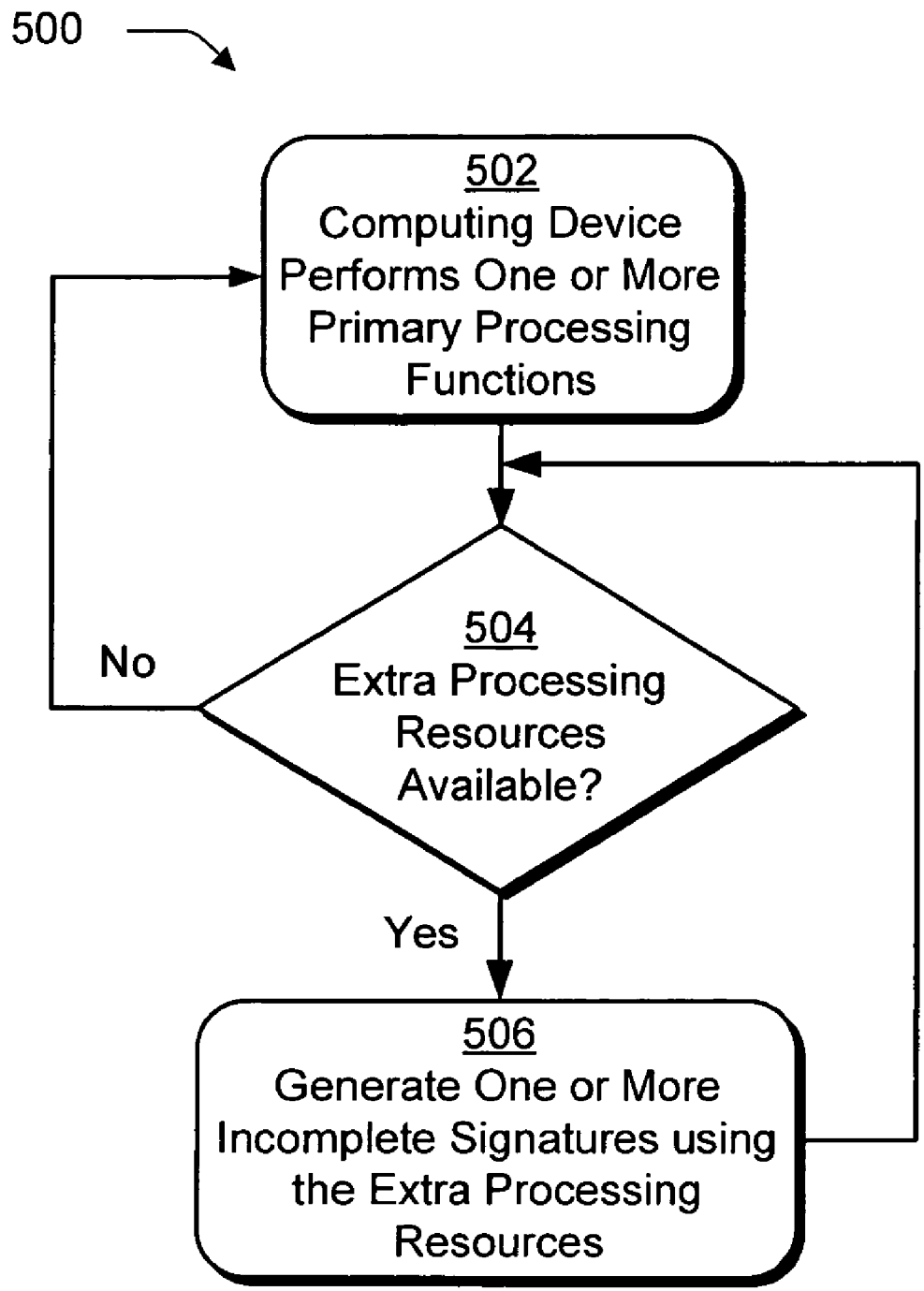
FIG. 5 is a flow diagram depicting a procedure in an exemplary implementation in which a front end/backend architecture of FIG. 2 for providing digital signatures is implemented on a single computing device.

FIG. 5 is a flow diagram depicting a procedure 500 in an exemplary implementation in which the front end/backend architecture of FIG. 2 for providing digital signatures is implemented on a single computing device. The computing device performs one or more primary processing functions, for which, the computing device is primarily configured to perform (block 502). For example, the computing device may be configured as an email server which is primarily configured to manage email, such as to provide a plurality of email accounts for access by a plurality of clients over a network. In another instance, the computing device may be configured to facilitate instant messaging, such as to route instant messages between a plurality of clients. In a further instance, the computing device may be configured for user authentication, such as to accept a user identification (ID) and password so that the user can "logon" to a service, such as a web site (e.g., a banking website, ecommerce provider, and so on), email provider, instant messaging provider, and so forth.

A determination is made as to whether extra processing resources are available from the computing device (decision block 504). This determination may be performed in a variety of ways. For example, a module may be executed to monitor the current status and dynamically determine the processing resources based on current and predicted processor, memory and/or network load whether additional processing resources are or will be available. In another example, a user of the computing device may determine that extra processing resources are available during particular times in a given day, particular day of the week, and so on. For instance, the computing device may be configured as a email server which is not typically accessed between midnight and 4 am. A variety of other examples are also contemplated.

If extra processing resources are available ("yes" from decision block 504), the computing device generates one or more incomplete signatures using the extra processing resources (block 506). For example, the computing device may execute an offline signature module 228(b) of FIG. 2 to perform the offline portion of an online/offline signature algorithm. If extra processing resources are not available ("no" from decision block 504), the computing device continues to perform the primary processing functions (block 502). In this way, the computing device may leverage "idle times" to generate incomplete signatures which may be utilized at a later time to digitally sign a message. Although a single computing device was described in this example, such functionality may be implemented on a plurality of computing devices. For example, a server farm may also employ similar functionality to generate incomplete signatures when one or more of the servers are not being utilized to their full capacity.

Figure 6:
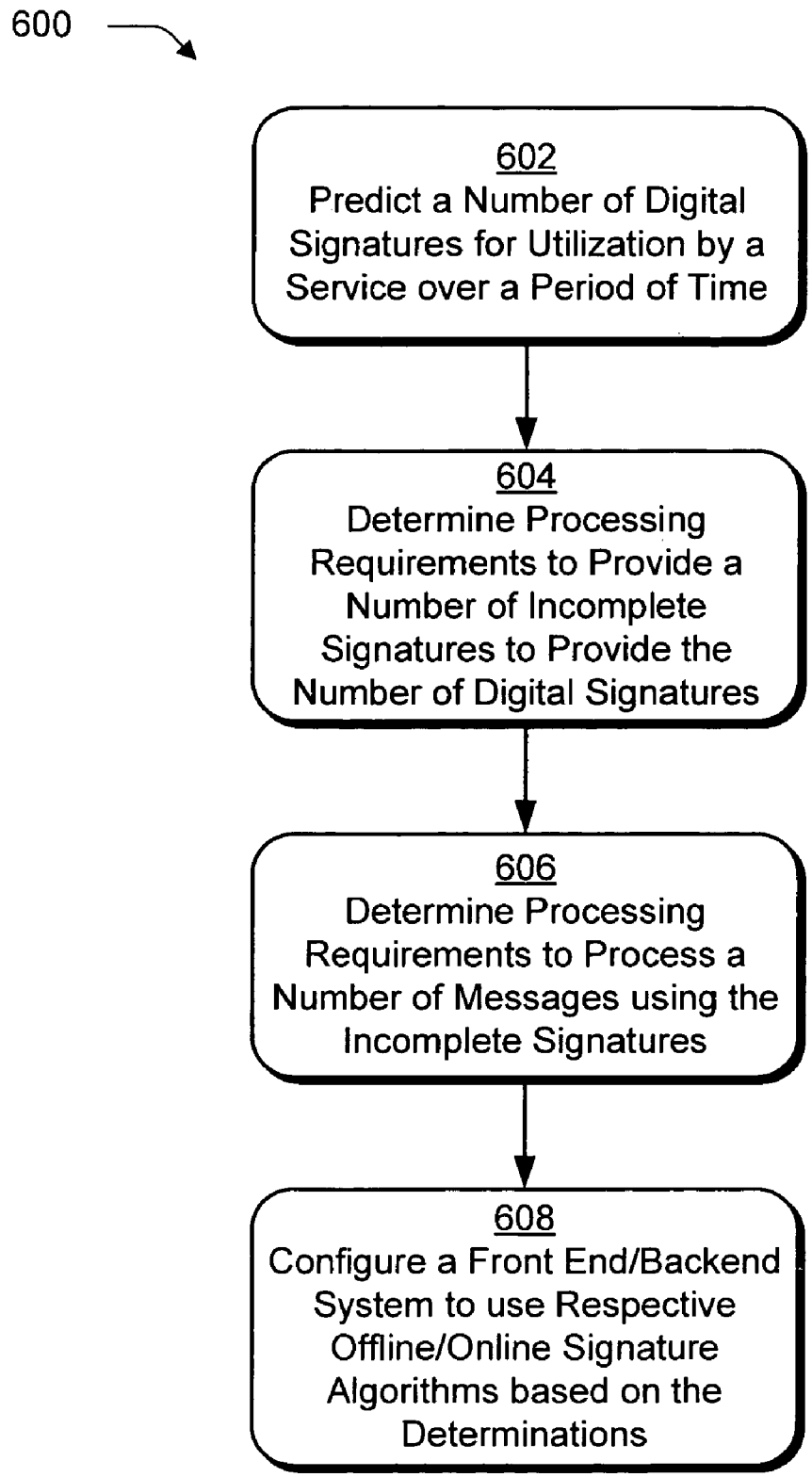
FIG. 6 is a flow diagram depicting a procedure in an exemplary implementation in which configuration and optimization is described of a front end/backend architecture which is configured to implement an online/offline signature algorithm.

FIG. 6 is a flow diagram depicting a procedure 600 in an exemplary implementation in which configuration and optimization is described of a front end/backend architecture which is configured to implement an online/offline signature algorithm. A prediction is made as to a number of digital signatures that will be required for a period of time (block 602). For example, an email provider may determine a number of emails that are typically sent by the provider over a corresponding period of time, an authentication service may determine a number of authentication messages sent over a corresponding period of time, and so on. The providers may then make a prediction as to whether that number is expected to increase, such as due to a number of new subscribers.

A determination is then made as to the processing requirements which are to be utilized to provide a number of incomplete signatures which are sufficient to provide the determined number of digital signatures (block 604). For example, a network administrator may determine an amount of processing resources needed to generate each incomplete signature based on the encryption key utilized, length of random number accepted as an input by an offline portion of an online/offline signature algorithm, the particular online/offline signature algorithm utilized, and so on.

A determination is also made as to the processing requirements which are to be utilized to process the number of messages using the incomplete signatures in conjunction with an online portion of an online/offline signature algorithm (block 606). For example, the network administrator may determine an average message size which is to be processed by the architecture. The network administrator may then determine an amount of processing resources needed to process this average message size utilizing the incomplete signature in conjunction with an online portion of an online/offline signature algorithm. This amount of processing resources may then be multiplied by the number of messages expected to be processed by the architecture during the period of time, as predicted previously.

Based on the determinations, a front end/backend system is configured to use respective online/offline portions of an online/offline signature algorithm (block 608). For example, based on the determination of the processing resources needed to perform the offline portion for the predicted number of messages, the network administrator may determine which types of server should be utilized, hardware considerations of the server (e.g., whether to employ cryptographic accelerators), amount of storage needed to store the plurality of incomplete signatures, amount of excess capacity desired, and so on. The network administrator may also make a separate determination as to the computing devices which will be utilized to perform the online portion. Thus, the front end and the backend of this architecture may be scaled accordingly to their respective separate requirements.

The network administrator is also able to accurately determine the cost of providing the digital signatures. For instance, as previously described the offline portion of the online/offline signature algorithm may consume over ninety-five percent of the processing resources utilized to generate the digital signature. Therefore, the network administrator may determine the cost of providing the backend portion of the architecture and thus accurately judge the costs of providing the digital signatures. A variety of other examples of configuring a front end/backend architecture are also contemplated. For example, the architecture may be implemented on a single computing device, a front end may include processing and storage for the incomplete signatures generated by another computing device which implements the backend, and so forth.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer implemented method comprising:
generating a plurality of incomplete signatures utilizing an offline portion of an online/offline signature algorithm;
buffering the plurality of incomplete signatures in storage that is accessible by a module configured to process a plurality of messages; and
processing each said message by an online portion of the online/offline signature algorithm utilizing a unique said incomplete signature to generate a digital signature for each said message, wherein different subsets of the incomplete signatures are combined to create the digital signature and each incomplete signature is generated by combining a random number and an encryption key, wherein the encryption key is a private key of a public/private key pair.

2. A method as described in claim 1, wherein the generating is performed before receipt of the plurality of messages by the module.

3. A method as described in claim 1, wherein the online portion of the online/offline signature algorithm employs a hashing algorithm.

4. A method as described in claim 1, wherein each said message is an email or an instant message.

5. A method as described in claim 1, wherein each said message is configured to authenticate a user.

6. A method as described in claim 1, further comprising:
performing the processing; and
outputting each said message and a corresponding said digital signature for communication to an intended recipient over a network.

7. A method comprising:
obtaining one of a plurality of incomplete signatures for each of a plurality of messages, wherein each said incomplete signature is generated by:
utilizing an offline portion of an online/offline signature algorithm; and
combining a random number and an encryption key, wherein the encryption key is a private key of a public/private key pair;
processing each said message utilizing a corresponding said incomplete signature to generate a digital signature, wherein the processing involves an online portion of the online/offline signature algorithm and combining different subsets of the incomplete signatures to create the digital signature; and
forming a plurality of communications for output, wherein each said communication includes one of the plurality of messages and a corresponding said digital signature that was generated from the message.

8. A method as described in claim 7, wherein the plurality of incomplete signatures generated before receipt of the plurality of messages.

9. A method as described in claim 7, wherein the plurality of incomplete signatures are obtained from storage that is configured to act as a buffer between a front end configured to perform the processing and a backend that is configured to generate the plurality of incomplete signatures.

10. A method as described in claim 7, wherein:
the obtaining and the processing are performed by a front end; and
the plurality of incomplete signatures is generated by a backend that is separate from but in communication with the front end.

11. A method as described in claim 7, wherein at least one said message is configured as an email or an instant message.

12. A method as described in claim 7, wherein at least one said message is configured to authenticate a user.

13. A system comprising:
a backend configured to generate a plurality of incomplete signatures using an offline portion of an online/offline signature algorithm, wherein each incomplete signature is generated by combining a random number and an encryption key, wherein the encryption key is a private key of a public/private key pair;
storage configured to store the plurality of incomplete signatures; and
a front end configured to process a plurality of messages using the plurality of incomplete signatures to form a plurality of digital signatures such that each said message has a corresponding said digital signature wherein different subsets of the incomplete signatures are combined to create each respective digital signature.

14. A system as described in claim 13, wherein the front end is implemented utilizing one or more computing devices and the backend is implemented utilizing one or more other computing devices.

15. A system as described in claim 13, wherein:
the front end and the backend are implemented by a computing device; and
the backend generates the plurality of incomplete signatures during idle time of the computing device.

16. A system as described in claim 13, wherein the front end is implemented utilizing one or more executable modules and the backend is implemented utilizing one or more other executable modules.

17. A system as described in claim 13, wherein at least one said message is an email or an instant message.

18. A system as described in claim 13, wherein at least one said message is an instant message.

19. A system as described in claim 13, wherein the front end employs a hashing algorithm.

20. An internet service provider including a system as described in claim 13.

* * * * *